No. 608,057. Patented July 26, 1898.
G. A. LONGLEY.
MOWING MACHINE.
(Application filed Sept. 18, 1896.)
(No Model.) 2 Sheets—Sheet 1.
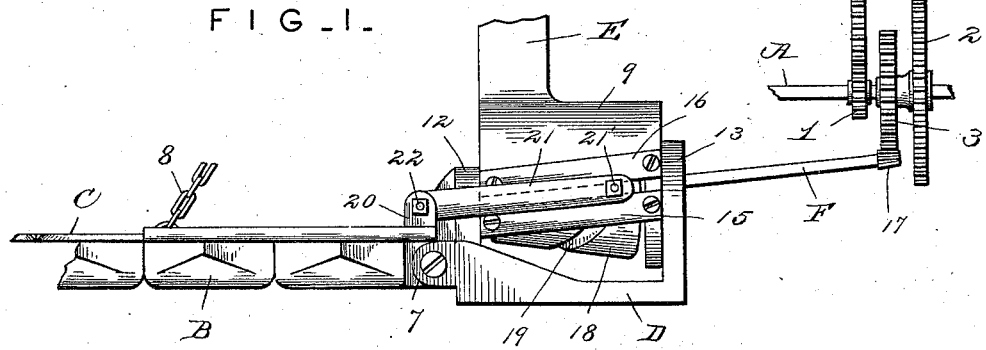
FIG. 1.
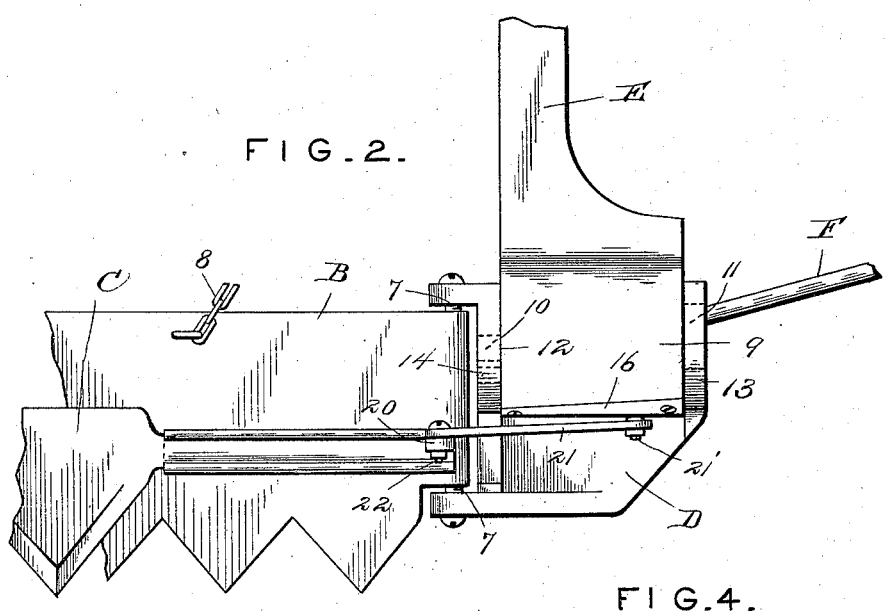
FIG. 2.
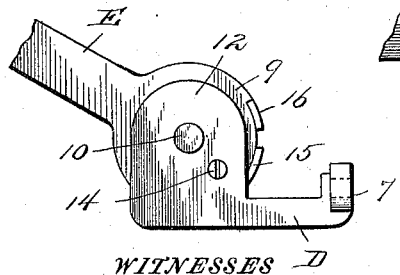
FIG. 3.
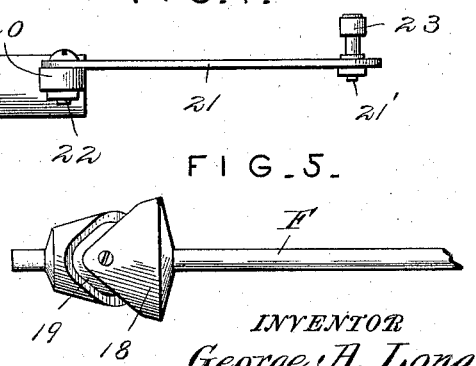
FIG. 4.
FIG. 5.
WITNESSES
Harry L. Ames.
J. C. Tappan.
INVENTOR
George A. Longley.
by John Wedderburn
Attorney

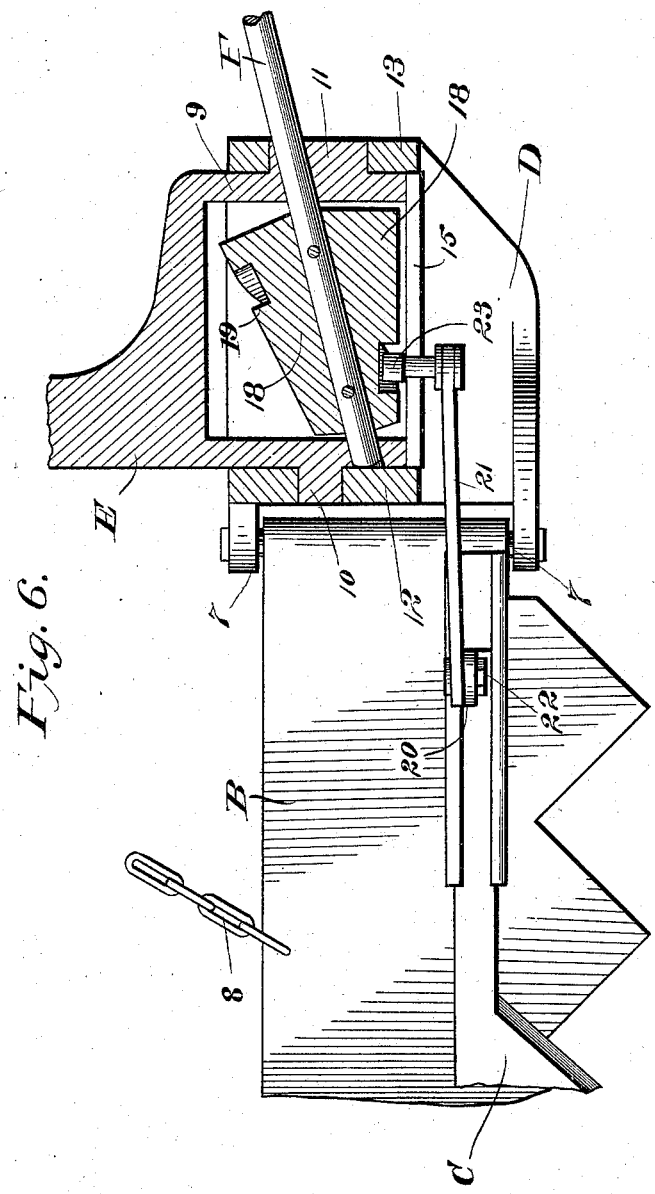

UNITED STATES PATENT OFFICE.

GEORGE A. LONGLEY, OF GROTON, MASSACHUSETTS.

MOWING-MACHINE.

SPECIFICATION forming part of Letters Patent No. 608,057, dated July 26, 1898.

Application filed September 18, 1896. Serial No. 606,238. (No model.)

*To all whom it may concern:*

Be it known that I, GEORGE A. LONGLEY, a citizen of the United States, residing at Groton, in the county of Middlesex and State of Massachusetts, have invented certain new and useful Improvements in Mowing-Machines; and I do hereby declare the following to be a full, clear, and exact description of the invention, such as will enable others skilled in the art to which it appertains to make and use the same.

My invention relates to mechanical movements, and more particularly to the cutter-bar-operating mechanism of mowers and reapers.

My object is to dispense with the ordinary form of reciprocating pitman and to provide improved mechanism which will more satisfactorily accomplish its purpose.

The invention consists of certain new and peculiar features, as will appear more in detail hereinafter.

In the accompanying drawings, Figure 1 is a front elevation showing a portion of a mower equipped with my improvements; Fig. 2, a top view; and Figs. 3, 4, and 5, detail views. Fig. 6 represents a substantially horizontal section through the arm and shoe of the cutting apparatus, showing the obliquely-arranged knife-actuating shaft in plan view.

A designates the main axle of the mower, to which is secured a pinion 1. Two other gears 2 and 3, one larger than the other, are connected together and loosely carried by the axle. A second shaft 4 carries a large gear 5, which meshes with the pinion 1, and a pinion 6, which meshes with gear 2. The set of speed-gearing just described being old and well known, I do not, therefore, lay any claim to the same.

B designates a finger-bar, and C a cutter-bar, such as ordinarily employed in machines of this class. An inner shoe is shown at D, and the finger-bar is hinged to said shoe at 7, so that it, together with the cutter-bar, can be raised perpendicularly by any preferred mechanism 8, so that obstructions may be passed.

E designates the supporting or frame-arm. This arm is formed into an open head 9 at its lower end and has trunnions 10 and 11, which are received in ears 12 and 13 on the shoe D. A pin 14 serves to hold the head 9 fixed in relation to the shoe. At 15 and 16 are shown two obliquely-disposed removable guides, which are secured to the head and extend across the opening therein.

F represents a shaft. This shaft carries a conical gear 17 on its upper end, and this gear meshes with the intermediate gear 3. On the lower end of the shaft is a conical cam 18, which is provided with a peripheral cam-groove 19. The shaft extends obliquely in relation to the frame-arm and passes through the trunnion 11 thereof and is journaled in the outer arm of the head 9, adjacent to the trunnion 10. The end of the shaft is journaled in the head 9, and the conical cam is housed by said head.

On the inner end of the cutter-bar there is an ear 20.

The numeral 21 designates a link, which is pivoted on a bolt 22, that extends through the ear. A second bolt 21' projects from the other end of the link in between the guides 15 and 16 and carries a roller 23, which plays in the cam-groove 19.

When the machine advances, the rotation of the axle sets the speed-gearing in operation, causing the shaft to rotate at a high rate. As the shaft F rotates the movement of the cam causes the roller to play in the cam-groove, and a rapid reciprocation is imparted to the cutter-bar.

By reference to Figs. 2 and 6 it will be seen that the shaft F, to which the cone-shaped cam-wheel is secured, extends obliquely downward and forward, its forward inclination being sufficient to bring the forward face of said wheel into a plane parallel with the line of reciprocation of the knife-bar and its actuating-pitman, thereby keeping the cam-groove in said wheel always in proper relation to the pin on the pitman for actuating the latter. Further, by the oblique arrangement of the shaft, as described, its outer end is brought down to near the plane of the knife-bar, thereby obviating the necessity for gearing between the outer end of said shaft and another shaft carrying the cam-wheel actuating the knife-bar.

With the use of my improved mechanism a great amount of the clatter usually accompanying cutters and reapers is done away with, as the parts operate easily and almost noiselessly.

Having thus described my invention, what I claim as new, and desire to secure by Letters Patent, is—

1. The combination with the hinged cutting apparatus of a mowing-machine, for actuating the knife-bar thereof, of a peripherally-grooved, cone-shaped cam-wheel, and the inclined shaft to which said cone-wheel is secured, arranged in oblique relation in both a horizontal and a transverse plane, and journaled in a housing for said wheel, the inclination of said shaft being such as to bring its outer end carrying said cam-wheel down substantially in the plane of a pitman actuating the knife-bar with the forward face of the cone-wheel engaging the pitman in a plane parallel therewith, substantially as described.

2. The combination with the hinged cutting apparatus of a mowing-machine, of the obliquely or forwardly and downwardly extending cutter-actuating shaft, a cone-shaped wheel fast on said shaft provided with a peripheral cam-groove, a head or housing for said cam-wheel and in which the inclined shaft is journaled, and inclined guide-bars on the cam-housing for guiding one end of the pitman and holding it in engagement with the cam-wheel on the actuating-shaft, substantially as described.

3. In a mowing-machine, the hinged cutting apparatus thereof, in combination with the inclined or obliquely-arranged cutter-actuating shaft, the interposed link or pitman and the grooved, cone-shaped cam-wheel for actuating said pitman, the housing for said cam-wheel, the supporting arm or head carrying said housing and to which the cutting apparatus is hinged, the inclined shaft being journaled at its outer end in said housing and passing through the trunnion at the inner side thereof and on which the shoe is supported, and inclined guides in said supporting arm or head for guiding one end of the pitman or link, substantially as described.

In testimony whereof I have signed this specification in the presence of two subscribing witnesses.

GEORGE A. LONGLEY.

Witnesses:
W. W. CLARKE,
J. W. GILDAY.